United States Patent
Hlasny (10) Patent No.: US 7,386,621 B1
(45) Date of Patent: Jun. 10, 2008

(54) EFFICIENT AND RELIABLE TRANSMISSION VIA A HYBRID BROADCAST-POINT-TO-POINT SYSTEM

(75) Inventor: Daryl Hlasny, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 870 days.

(21) Appl. No.: 09/653,073

(22) Filed: Aug. 31, 2000

(51) Int. Cl.
G06F 15/16 (2006.01)
H04J 14/00 (2006.01)
H04J 3/16 (2006.01)
H04N 7/173 (2006.01)

(52) U.S. Cl. ............ 709/230; 709/231; 709/232; 709/233; 709/235; 398/66; 725/87; 725/101; 370/471; 370/477

(58) Field of Classification Search ......... 709/240, 709/241, 242, 244, 245, 249, 239, 232; 398/66; 714/818, 819, 820, 821, 822, 823, 825; 725/87, 725/101

See application file for complete search history.

(56) References Cited

U.S. PATENT DOCUMENTS

| | | |
|---|---|---|
| 4,725,834 A | 2/1988 | Chang et al. |
| 5,086,428 A | 2/1992 | Perlman et al. |
| 5,109,384 A | 4/1992 | Tseung |
| 5,216,675 A | 6/1993 | Melliar-Smith et al. |
| 5,245,607 A | 9/1993 | Caram |
| 5,280,476 A | 1/1994 | Kojima et al. |
| 5,297,143 A | 3/1994 | Fridrich et al. |
| 5,331,647 A | 7/1994 | Seki et al. |
| 5,345,599 A | 9/1994 | Paulraj et al. |
| 5,357,508 A | 10/1994 | Le Boudec et al. |
| 5,487,065 A | 1/1996 | Acampora et al. |
| 5,590,125 A | 12/1996 | Acampora et al. |
| 5,610,916 A | 3/1997 | Kostreski et al. |
| 5,631,907 A | 5/1997 | Guarneri et al. |
| 5,671,216 A | 9/1997 | Subasingha et al. |
| 5,708,961 A | 1/1998 | Hylton et al. |
| 5,781,633 A | 7/1998 | Tribble et al. |
| 5,790,669 A | 8/1998 | Miller et al. |
| 5,793,973 A * | 8/1998 | Birdwell et al. ............ 709/223 |
| 4,823,338 A | 11/1998 | Chan et al. |
| 5,852,666 A | 12/1998 | Miller et al. |
| 5,923,831 A | 7/1999 | Palmer et al. |
| 5,960,087 A | 9/1999 | Tribble et al. |
| 5,991,693 A | 11/1999 | Zalewski |
| 6,002,851 A | 12/1999 | Basavaiah et al. |

(Continued)

*Primary Examiner*—Ashok B. Patel
(74) *Attorney, Agent, or Firm*—Chernoff, Vilhauer, McClung & Stenzel (57) ABSTRACT

In wireless networks, data objects are typically transferred from a data distributor to a data recipient by reliable point-to-point communication between the distributor and the recipient. However, the time to transfer data by point-to-point communication can become excessive if the number of recipients is large. Efficient and reliable data transfer is provided by a system incorporating broadcast and point-to-point communication topologies. The data is initially broadcast to all recipients. Data broadcasting is followed by polling the recipients. If the data missing after a broadcast can be transferred in less time by point-to-point communication then that topology is chosen to complete the transfer. If not, the missing data is broadcast again to all recipients. The efficiency of the broadcast phase can be improved by designating a representative to acknowledge successful data transfer on behalf of all recipients. A most suitable representative of all recipients can be selected by comparing missing data for each recipient to the missing data of all other recipients.

5 Claims, 6 Drawing Sheets

U.S. PATENT DOCUMENTS

| | | |
|---|---|---|
| 6,012,159 A | 1/2000 | Fischer et al. |
| 6,396,814 B1 * | 5/2002 | Iwamura et al. ............ 370/256 |
| 6,466,552 B1 * | 10/2002 | Haumont .................... 370/310 |
| 6,757,736 B1 * | 6/2004 | Hutchison et al. .......... 709/232 |

* cited by examiner

EFFICIENT AND RELIABLE TRANSMISSION VIA A HYBRID BROADCAST-POINT-TO-POINT SYSTEM

BACKGROUND OF THE INVENTION

The present invention relates to data transmission and, more particularly, a method of data transmission combining broadcast and point-to-point transmission topologies for efficient and reliable data transfer.

Emerging wireless communication systems are intended to provide voice and data communication between a wide variety of devices. Two such systems are systems complying with the SPECIFICATION OF THE BLUETOOTH SYSTEM, CORE, The Bluetooth Special Interest Group, 1999 (Bluetooth systems) and systems complying with the SHARED WIRELESS ACCESS PROTOCOL (CORDLESS ACCESS) SPECIFICATION (SWAP-CA), The HomeRF Technical Committee, 1999 (HomeRF systems). Bluetooth and HomeRF systems are short range wireless radio systems operating in the unlicensed Instrument, Scientific, and Medical (ISM) band at 2.4 GHz. Frequency hopping, spread spectrum techniques are utilized to reduce interference and fading in the noisy environment in which these systems will operate. For example, with Bluetooth systems information is exchanged as packets in a slotted communication channel. Slots in the communication channel are 625 μsec. in length and data packets are typically one-slot in length but can cover up to five slots. The system shifts transmission frequency for each slot by hopping through a psuedo-random sequence of 79 frequencies displaced from each other by 1 MHZ. The Bluetooth and Home RF systems support both asynchronous (primarily, data) and synchronous (voice) communication.

Typically, data communication between end systems of wireless networks utilizes a point-to-point communication topology. Point-to-point communication with acknowledgment by the receiver affords the opportunity to utilize error detection and control techniques to provide reliable data delivery. Reliable delivery is important for data transfer because any corruption of the data can render an entire data object useless. In the Bluetooth system forward error control (FEC) is applied to the packet header and a Cyclic Redundancy Check (CRC) is applied to the payload of data packets. FEC can also be applied to the data payload if it is determined that the communication channel is sufficiently unreliable to justify the additional overhead. The receiver acknowledges successful receipt of each packet with a reverse transmission to the sender and if an error is detected in either the packet header or the payload an automatic request for retransmission (ARQ) is issued. In response, the sender retransmits the data until the recipient either signals that the data was correctly received or a predetermined number of transmissions are exceeded. While point-to-point communication provides reliable delivery, it also requires that at least one copy of the data be transmitted individually to each recipient. Therefore, the total time required to distribute a data file to all recipients is proportional to the number of recipients and, if the number of recipients is large, the transmission time can become excessive.

On the other hand, broadcasting a single copy of the data simultaneously to all recipients eliminates the redundant transmission of copies to individual recipients that is inherent in point-to-point communication. Since the time required for data distribution by broadcasting is independent of the number of recipients, broadcasting is potentially more efficient when communicating with a large group. However, delivery is unreliable when broadcasting because the sender is unaware of the recipient's success in receiving the data. To improve the likelihood of success, data may be rebroadcast, one or more times, but rebroadcasting is performed without knowledge of the current conditions of the communication channel and the total time required for transmission increases in proportion to the number of times the data is broadcast. Since the likelihood of error increases as the size of the transmitted data object increases, broadcasting is not used to transmit large data objects in noisy, dynamic communication channels. Short range wireless systems, such as Bluetooth and HomeRF systems, are characterized by communication channels that are noisy and subject to multi-path fading due to structures in the transmission area.

What is desired, therefore, is a communication method for efficiently and reliably transferring data to a large number of recipients in a noisy communication environment.

SUMMARY OF THE INVENTION

The present invention overcomes the aforementioned drawbacks of the prior art by providing a method of transferring data from a distributor to a plurality of recipients comprising the steps of broadcasting unreceived data to the recipients; repeating the broadcasting of unreceived data until a time for transferring the unreceived data by point-to-point communication with the recipients obtains a predetermined relationship to a time for the broadcasting; and, thereafter, transferring the unreceived data by point-to-point communication with at least one recipient. Data transfer with a wireless network is typically performed by point-to-point communication with each of the data recipients. The time required to transfer data by point-to-point communication can be excessively long if there if there are a large number of recipients. Broadcasting data simultaneously to all recipients is potentially an efficient method of transferring data to a large number of recipients but is not typically used for this purpose because the distribution station has no knowledge of the conditions of the communication channel. However, in the present hybrid system missing data is identified by polling recipients following a broadcast of the data. For efficiency and reliability, the time required to transfer the missing data by point-to-point communication is estimated after a broadcast and the data is transferred by reliable point-to-point communication if the required time has obtained a predetermined relationship to the time required to broadcast the data. If not, the data is rebroadcast.

In addition, a representative recipient can be designated to report receipt of the data on behalf of all recipients during broadcasting. The representative may be designated or may be selected on the basis of success in receiving data. In some wireless systems, the representative may signal success in receiving data packets on a back channel without affecting the capacity of the forward (distributor-to-recipient) channel.

The foregoing and other objectives, features and advantages of the invention will be more readily understood upon consideration of the following detailed description of the invention, taken in conjunction with the accompanying drawings.

DETAILED DESCRIPTION OF THE PREFERRED EMBODIMENT

Figure 1:
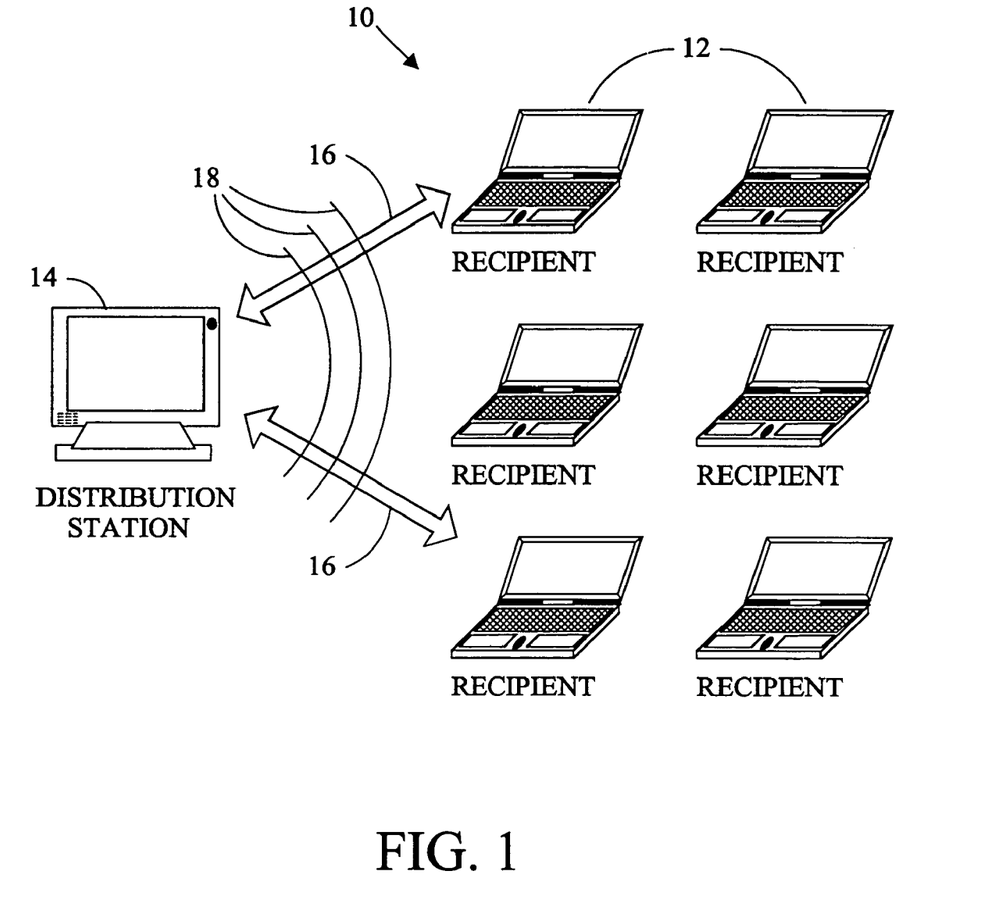
FIG. 1 is a schematic diagram of data distribution to a group of recipients.

Referring to FIG. 1, a wireless communication network 10 may be used to distribute data files to a number of recipients 12. For example, in a meeting or seminar a network distribution station 14 might be used to distribute data files representing presentation slides to the individual computers or other devices (recipients 12) in use by the meeting participants. Wireless communications systems such as systems complying with the SPECIFICATION OF THE BLUETOOTH SYSTEM, CORE, The Bluetooth Special Interest Group, 1999 (Bluetooth systems) or systems complying with the SHARED WIRELESS ACCESS PROTOCOL (CORDLESS ACCESS) SPECIFICATION (SWAP-CA), The HomeRF Technical Committee, 1999, (HomeRF systems) may be used to distribute the data. The Bluetooth and HomeRF systems are short range radio links operating at 2.4 GHz in the unlicensed Instrument, Scientific, and Medical (ISM) band. These systems utilize frequency hopping, spread spectrum techniques to reduce interference and fading in the noisy environments in which their communication channels exist. For example, with Bluetooth systems information is exchanged between end systems that assemble themselves into a network known as a piconet. Data is exchanged as packets in a slotted communication channel. Slots in the communication channel are 625 μsec. in length and data packets are typically one-slot in length but can cover up to five slots. The system shifts transmission frequency for each slot by hopping through a psuedo-random sequence of 79 frequencies displaced from each other by 1 MHZ. The Bluetooth and Home RF systems support both asynchronous (primarily, data) and synchronous (voice) communication.

Data objects are transferred by point-to-point communication 16 during which the distribution station 14 contacts and delivers the data to each individual recipient 12. Point-to-point communication is utilized in transferring data files because error detection and correction can be incorporated in point-to-point communication for reliable delivery. Reliable delivery is important for data transfer where a single error can render a data object useless. For example in a Bluetooth system, forward error control (FEC) in the form of a three-times repetition code is applied to the header of transmitted data packets. A cyclic redundancy check (CRC) code is applied to the packet data payload. In addition, FEC can be applied to the data payload of a packet to reduce the number of retransmissions of the data. However, FEC increases transmission overhead and can be avoided if the communication environment is relatively error free. After each packet is received, the recipient responds to the sender in a back channel communication slot indicating success or failure in the transfer of the data. If successful transfer is not acknowledged, an automatic repeat request scheme (ARQ) causes the sender to retransmit the data packet until success is either acknowledged or a predetermined number of transmissions are completed.

While point-to-point communication provides reliable delivery, it also requires that at least one copy of the data be transmitted individually to each recipient. Therefore, the total time required to distribute a data file to all recipients 12 is proportional to the number of recipients and, if the number of recipients 12 is large, the transmission time can become excessive. On the other hand, the typical short range wireless communication channel is too unreliable to permit the data to be simultaneously broadcast to all recipients 12. Noise from sources such as competing communication systems and microwave ovens, and multi-path fading due to walls and other structures are common characteristics of the short range wireless communication channels of Bluetooth and Home RF systems. However, the present inventor concluded that a hybrid communication system combining the favorable attributes of broadcasting 18 and point-to-point 16 communication could provide reliable data transmission with greater efficiency.

Figure 2:
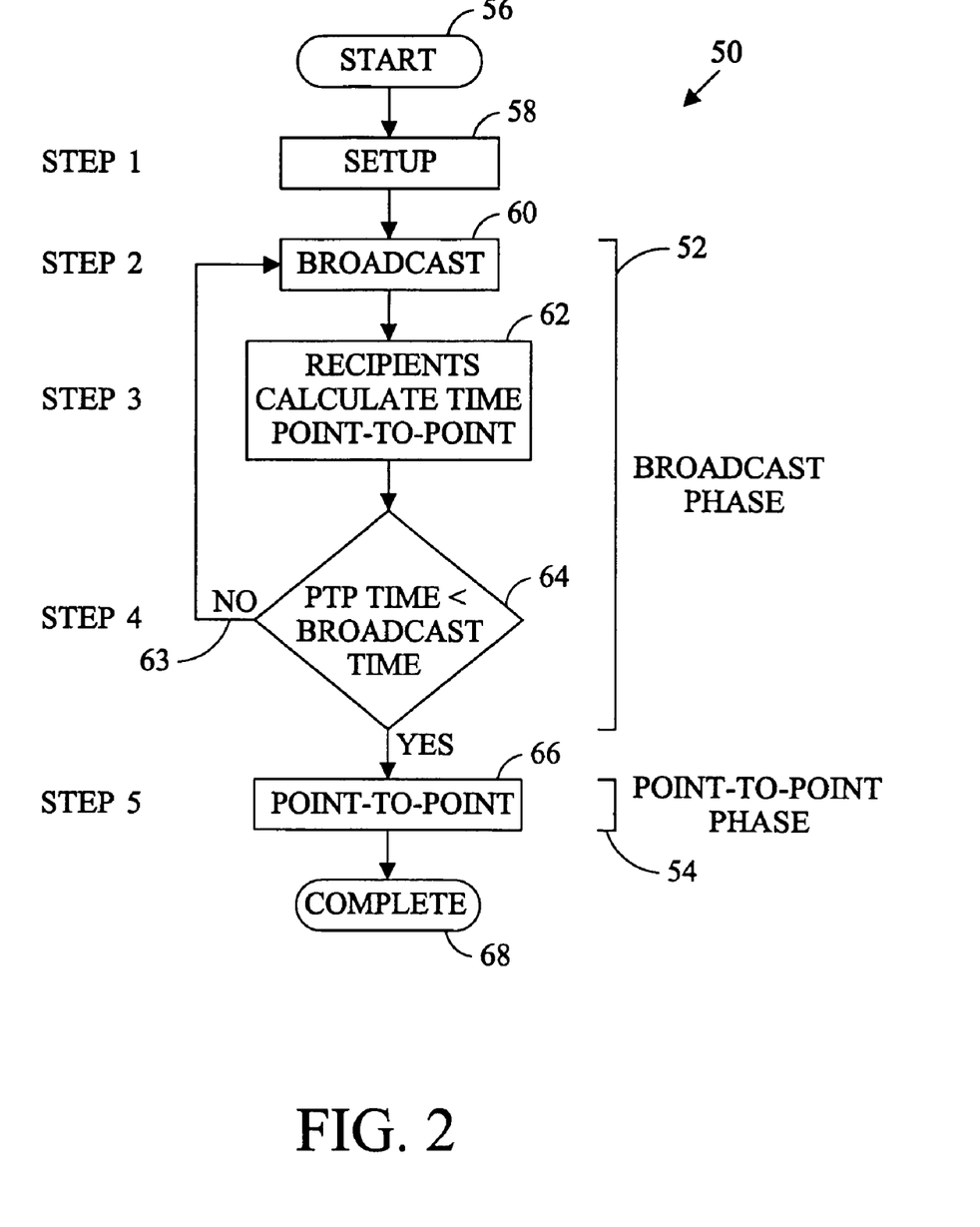
FIG. 2 is a flowchart of hybrid data transfer method.

Referring to FIG. 2, in the transmission method 50 of the present invention data is initially distributed to all recipients in a broadcast phase 52 (indicated by a bracket) followed by transmission of any unreceived data in a point-to-point phase 54 (indicated by a bracket). When communication is initiated 56, the distribution station 14 initiates a setup procedure 58. During setup 58, the distribution station 14 segments and indexes the data according to the communication protocols of the system. In an exemplary Bluetooth system the data is divided into data segments and a header is created for each segment defining essential information related to the pending transmission. During setup 58, the distribution station 14 identifies the recipients 12 and transmits the header to the recipients. The distribution station 14 may also estimate the quality of the communication channel to select the forward error correction to be applied or the number of repetitions of the transmission to be used during the broadcast phase 52.

Following setup 58, the distribution station 14 simultaneously broadcasts 60 the data segments in sequential order to all recipients 12. The recipients 12 perform an error check of the received data using the Cyclic Redundancy Check (CRC) code or other error detection process to be applied to the data packets. Data segments received without error are included in a segment list. The recipients 12 then are polled 62 by the distribution station 14 and unreceived data are identified from the segment lists and reported by the recipients.

Figure 3:
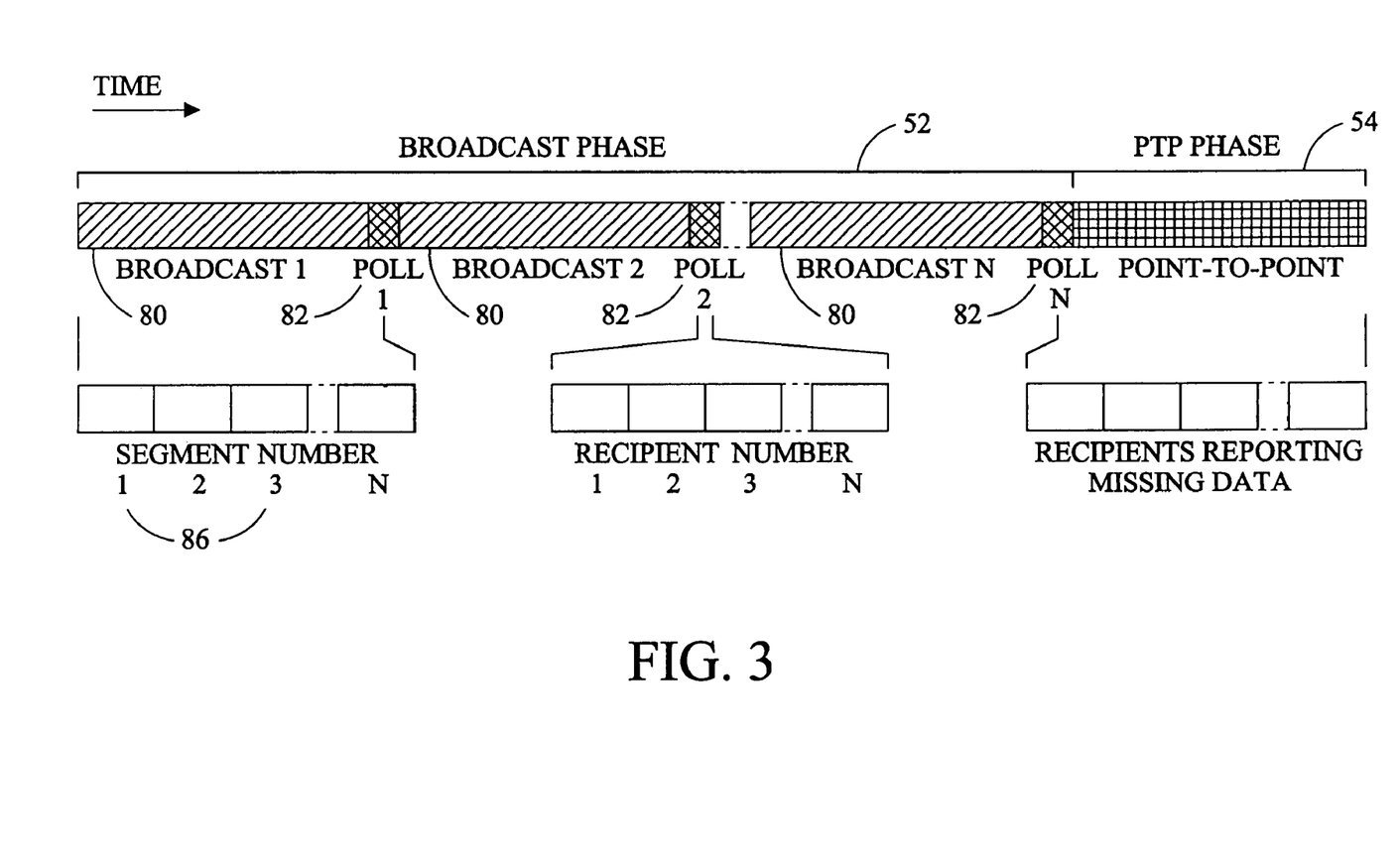
FIG. 3 is a timing diagram of an exemplary data transfer by the hybrid data transfer method.

Polling is performed by point-to-point connection with each recipient 12. Referring to FIG. 3, the duration of the polling period 82 is proportional to the number of recipients 12 responding to the polling and the quality of the communication channel.

Statistics related to the quality of the communication channel are calculated and the time required to transmit any missing data to each recipient 12 using reliable point-to-point transmission is estimated 62. Unless the estimated time to complete error-free data transfer by point-to-point transmission obtains a predetermined relationship to the time required to re-broadcast the unreceived data 64, the unreceived data are broadcast 60 another time 63. Referring to FIG. 3, the broadcast phase 52 of the method typically comprises one or more broadcast periods 80 each followed by a polling period 82. If all data segments 86 are broadcast in each broadcast period 80, the duration of the broadcast period 80 is proportional to the size of the data file and the effective data rate of the communication channel. In this case, the broadcast period 80 is fixed, independent of the channel quality, and independent of the number of recipients. Alternatively, re-broadcasting can be limited to only received data; the data not successfully received as a result of an earlier broadcast. In this case, the broadcast period will successively shorten as the quantity of missing data is reduced with each rebroadcast. Polling is by point-to-point connection with each of the recipients 12. The duration of the polling period 82 is proportional to the number of recipients 12 and the quality of the communication channel. The duration of the broadcast phase 52 is the product of the sum of the broadcast 80 and polling 82 periods and the number of rebroadcasts.

The number of times the data is rebroadcast is determined 64 by a decision criterion relating the sum of the broadcast 80 and polling 82 periods to the expected duration of the point-to-point phase 54 of the method. The point-to-point phase comprises a sequence of point-to-point connections between the distribution station 14 and each data recipient 12 during which any missing data packets are transmitted to the recipient 12 and receipt is acknowledged by the recipient 12. Following a broadcast 60, the total number of missing packets is determined or estimated by polling the recipients 12. The time needed to complete the delivery of the data object is estimated from the number missing data packets and an estimation of the communication channel throughput. Unless the time needed to complete the transfer of the data object using point-to-point transfer is less than the time required to rebroadcast the data object, the data is rebroadcast.

Other criteria may be used to determine whether to rebroadcast the data or complete the transfer by point-to-point transmission. For example, an expected success rate for an additional broadcast can be estimated from the rates of successful transfers from prior broadcasts. The expected success rate can be used to estimate the number of remaining packets for transfer after an additional broadcast. If the sum of the time for an additional broadcast and a point-to-point transfer of the estimated remaining packets is less than the estimated time for point-to-point transmission of the currently missing packets, then the data object is broadcast again 63. On the other hand, the system might switch to the point-to-point method 66 after a predetermined number of broadcasts 60. When the system adopts point-to-point transmission 66, the data is transmitted to each recipient until all the recipients have correctly received the data or the system determines that data transmission to one or more recipients is not possible and the transmission is terminated 68.

Figure 4:
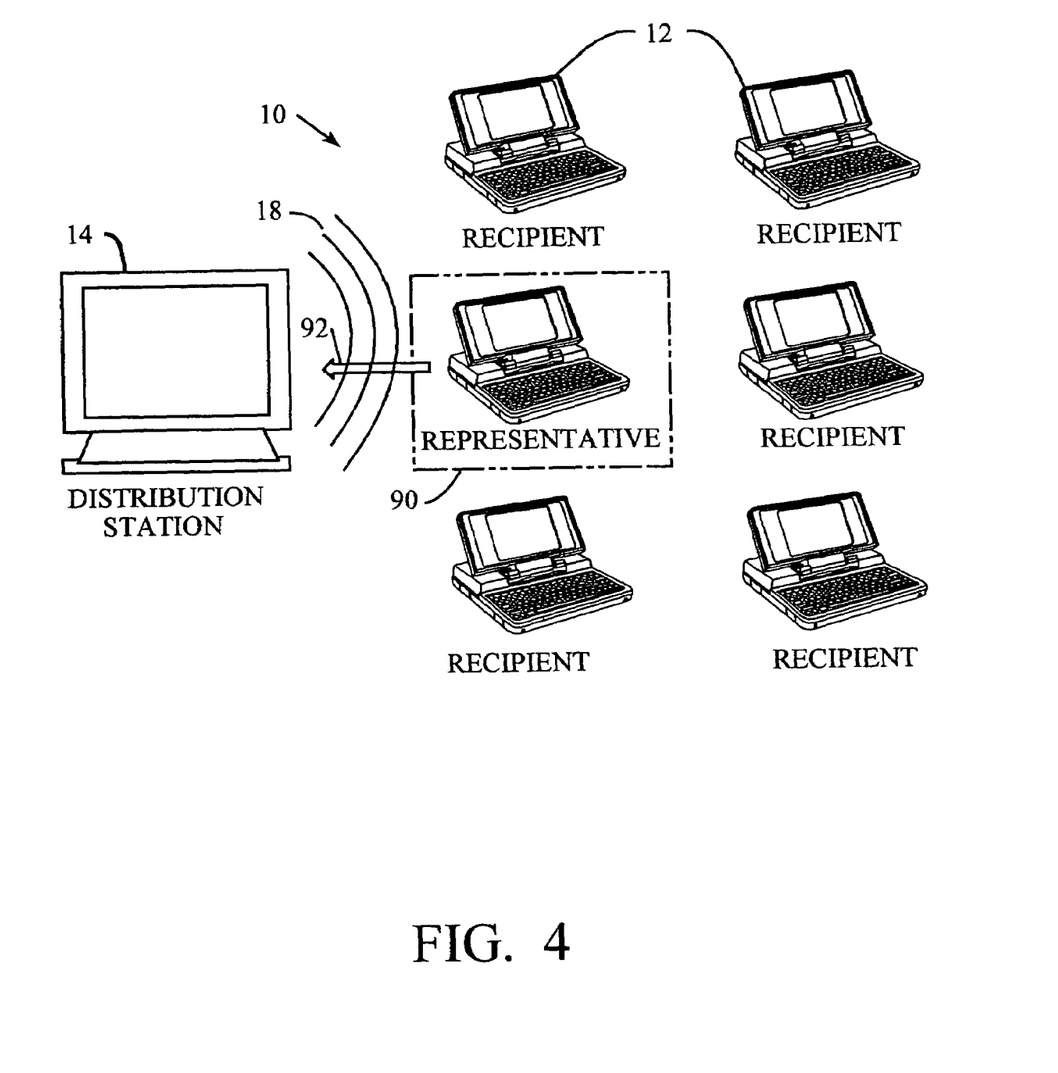
FIG. 4 is a schematic diagram of data distribution to a group of recipients including a representative recipient.
Figure 5:
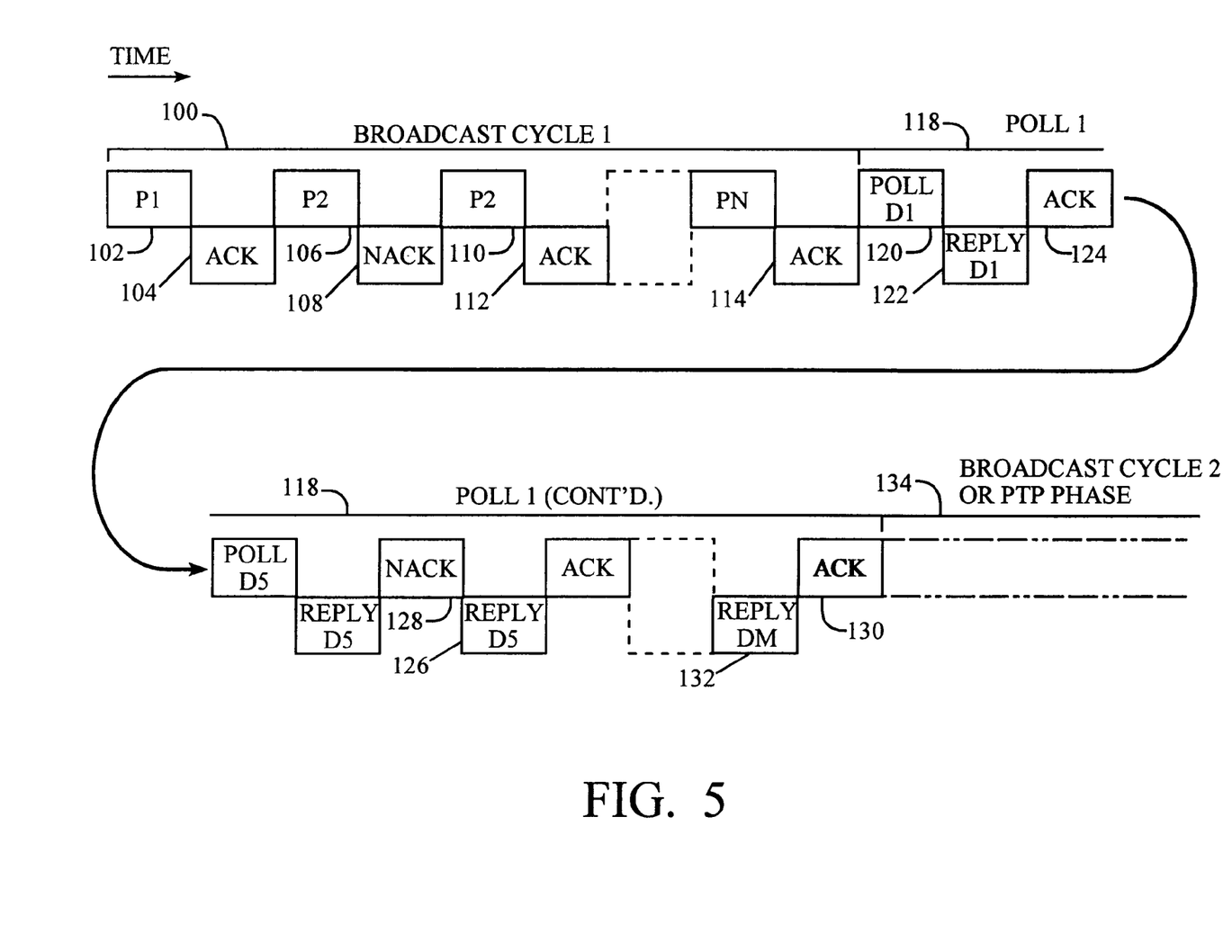
FIG. 5 is a timing diagram of an exemplary data transfer by a first hybrid data transfer method with acknowledgment by a representative recipient.
Figure 6:
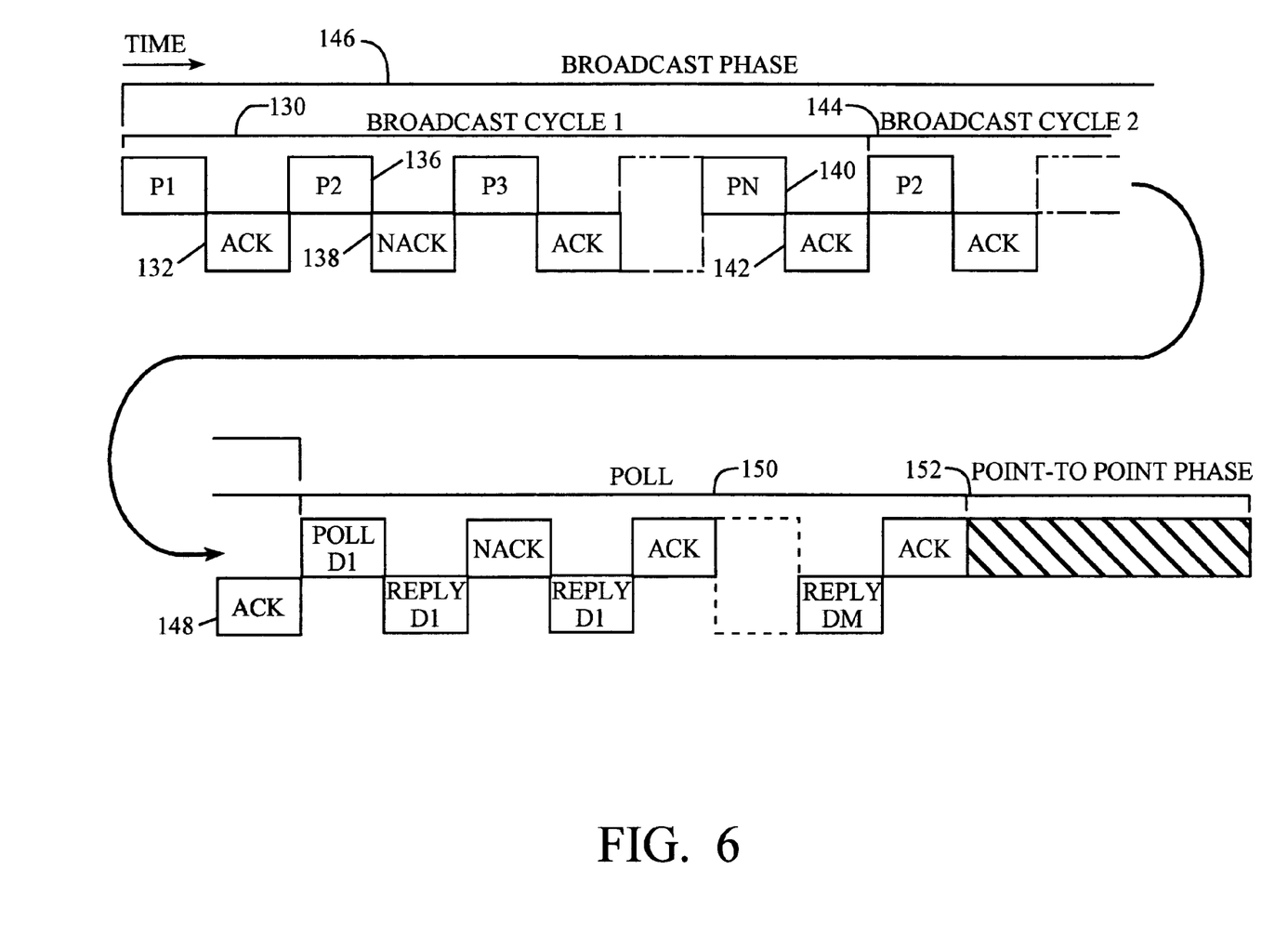
FIG. 6 is a timing diagram of an exemplary data transfer by a second hybrid data transfer method with acknowledgment by a representative recipient.

Referring to FIG. 4, to increase the efficiency of the broadcast phase 52, one or more "representative" recipients 90 can be designated to perform error detection and respond to broadcasts by the distribution station 14 on behalf of all of the recipients 12. Since the channel conditions are likely to be similar for all recipients 12 in a short range wireless system, it is likely that other recipients will have had success similar to that of the representative 90 in receiving the packets or data units of the data object. In the Bluetooth system a distribution station-to-recipient channel slot is followed by a recipient-to-distribution station channel slot in which the recipient of a data packet can signal successful receipt of the data packet. While the recipient-to-distribution station slot is normally unused during broadcasting, a representative 90 can use this slot to signal its success in receiving a data packet 92 to the distribution station 14. As a result, the number of missing packets to be transmitted point-to-point 54 following completion of the broadcast phase 52 can be substantially reduced without capacity reduction for the forward (distribution station-to-recipient) link. FIGS. 5 and 6 are timing diagrams illustrating alternative data transfers of a data object comprising packets or data units, P1-PN, using the hybrid data transfer method with representative reporting.

Referring to FIG. 5, in a first broadcast cycle 100 the first packet (P1) is broadcast to all recipients in a first distributor-to-receiver slot 102. The representative 90 responds to the broadcast of the first packet or data unit with a transmission in the recipient-to-distributor slot 104 following the distributor-to-recipient slot used to broadcast the packet 102. Successful receipt of the packet is signaled with acknowledgment (ACK) 104. The second packet (P2) is broadcast in the next distributor-to-recipient slot 106. If the packet is not successfully received, the representative signals "not-acknowledged" (NACK) 108. If no acknowledgment signal is received by the distribution station 14, unsuccessful transmission is assumed. Since the second packet (P2) was not successfully received by the representative 90, it is rebroadcast 110 until the representative acknowledges receipt 112. The first broadcast cycle 100 is complete when the representative 90 has acknowledged receipt of final packet (PN) 114 of the data object.

Following completion of the first broadcast cycle 100, the distributor polls the recipients 118 to determine the identity of missing packets. Each recipient (D1-DM) is polled 120 by the distribution station 14, and replies 122 identifying missing data units. It is not necessary to poll the representative because it has already acknowledged receipt of all packets. The distribution station acknowledges successful receipt of the reply 124. The reply is repeated 126 in the event of no acknowledgment from the distribution station 128. The first polling 118 is completed upon acknowledgment 130 of the reply of the last recipient 132. The duration of the polling is proportional to the channel quality and the number of recipients. At the completion of the first polling cycle 118, the times for rebroadcasting and transferring the missing data by point-to-point communication are compared and a decision 64 is made whether to initiate a second broadcast cycle or connect to each recipient by point-to-point communication 134.

FIG. 6 illustrates an alternative method of data transfer using the hybrid communication system with a reporting representative 90. In a first broadcast cycle 130, all packets (P1-PN) of the data object are successively broadcast to all recipients. The representative 90 acknowledges receiving each packet in the immediately following recipient-to-distributor slot 132. If acknowledgment of a packet (for example packet P2 136) is not received 138, the identity of the missing packet is noted by the distribution station 14. The first broadcast cycle is completed when the either receipt of the last packet (PN 140) is acknowledged 142 or the time for acknowledgment of successful receipt has passed. Packets not received by the representative are rebroadcast in a second broadcast cycle 144 and in subsequent broadcast cycles, if necessary. The broadcast phase 146 is completed when the representative has acknowledged receipt of all packets 148 in the data object or the time to rebroadcast the missing packets obtains a predetermined relationship to an estimated time to complete transfer of the data by point-to-point communication. Following completion of the broadcast phase 146, the recipients are polled 150 and the data transfer is completed by reliable point-to-point communication 152.

In addition to the representative's acknowledgment of broadcast packets to the distribution station 14, a packet status report may be cycled successively through all recipients 12 in the recipient-to-distribution station channel slot avoiding the need for a polling cycle to determine the identity of missing segments prior to the conclusion of the broadcast phase 52 and the initiation of point-to-point data transfer 54. The use of a representative 90 will extend the broadcast cycle 80 because a number of packets are likely to be rebroadcast in each period but will reduce the number of broadcast periods or cycles 80 required during the broadcast phase 52 improving the efficiency of the communication.

In a conference or seminar setting, a dedicated device might be designated to serve as the representative of all recipients 12. On the other hand, a representative can be selected by determining the identity of a recipient 12 whose communication channel characteristics are most similar to the characteristics of the other recipients of the group. Following an initial broadcast of a data object containing a number of packets indexed from 1 to N, the distribution station 14 polls each recipient 12 of the group (indexed 1 to x). The success or failure of the transmission of each packet is determined and the results are compiled in a transmission results matrix ($TM_x[\ ]$) for each station. For example, transmission results matrices for two exemplary recipients 12 might include results such as:

$TM_1$={1,1,1,0,1}
$TM_2$={1,1,0,1,1} where 1 indicates successful reception and 0 indicates unsuccessful reception of each of five data packets. A correlation matrix ($CM_{x,y}$) can be created by comparing each element of each transmission results matrix to all other transmission results matrices and summing the matches. For example:

Comparing $TM_1$ to $TM_1$={1,1,1,1,1}→sum=5
Comparing $TM_1$ to $TM_2$={1,1,0,0,1}→sum=3 produces correlation matrices elements:

$CM_{1,1}$=5, and
$CM_{1,2}$=3

A summation result ($SM_x$) is created for each recipient by summing the results of each row of the correlation matrix:

$$SM_X = \sum_{y=1}^{n} CM_{x,y}$$

The recipient 12 (identified by its index value x) corresponding to the greatest summation result (SM) value is the recipient whose channel characteristics are most similar to all members of the group of recipients 12 and is designated as the representative.

Further, a representative may be dynamically selected by the distribution station 14. The role of representative can be rotated through all of the recipients 12 by designating a new representative as each packet is broadcast. Channel statistics obtained from each recipient as it acts as representative can be compared to identify the recipient that best represents the group of recipients 12. Dynamic selection of a representative avoids a requirement for an initial broadcast without a representative followed by polling of all recipients 12 to identify an appropriate representative.

All the references cited herein are incorporated by reference.

The terms and expressions that have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims that follow.

The invention claimed is:

1. A method of transferring data from a distributor to a plurality of recipients comprising the steps of:
    (a) broadcasting a sequential one of a plurality of packets together comprising data to be transferred to said plurality of recipients at a time when each said plurality of recipients is capable of receiving said data by point-to-point communication;
    (b) repeating step (a) until a time for the completion of transferring said sequential one of a plurality of packets by point-to-point communication with said recipients obtains a predetermined relationship to a time for the completion of said broadcasting, wherein each successive iteration of repeating step (a) is preceded by the steps of:
        (i) receiving a value from at least one designated representative recipient, each representing at least one other non-representative recipient, said value indicating whether said sequential one of said plurality of packets has been received;
        (ii) assigning said received value to all recipients respectively represented by said at least one of said designated recipients; and
        (iii) evaluating whether said predetermined relationship has been attained based on said respective received values and said assigned values;
    (c) thereafter completing said transferring of said sequential one of a plurality of packets by point-to-point communication with at least one of said plurality of recipients; and
    (d) repeating steps (a) through (c) for the next sequential one of said plurality of packets until said data has been received by all recipients.

2. The method of claim 1 wherein the step of repeating said broadcasting until a time for transferring said sequential one of a plurality of packets by point-to-point communication with said recipients obtains a predetermined relationship to a time for said broadcasting comprises the steps of:
    (a) estimating a time to transfer said sequential one of a plurality of packets by point-to-point communication with said recipients, and
    (b) repeating said broadcasting of said sequential one of a plurality of packets if said time to transfer said sequential one of a plurality of packets by point-to-point communication is greater than said time to broadcast said data.

3. The method of claim 2 wherein the step of estimating a time to transfer said sequential one of a plurality of packets by point-to-point communication with said recipients comprises the steps of:
    (a) polling at least one recipient to identify non-receipt of said sequential one of a plurality of packets by said at least one recipient;
    (b) estimating a time to successfully transfer said sequential one of a plurality of packets to said recipient by point to point communication; and
    (c) summing said estimated times to successfully transfer said sequential one of a plurality of packets to recipients not reporting receipt of said sequential one of a plurality of packets.

4. The data transfer method of claim 1 wherein the step of repeating said broadcasting of said sequential one of a plurality of packets until a time for transferring said sequential one of a plurality of packets by point-to-point communication with said recipients obtains a predetermined relationship to a time for said broadcasting comprises the steps of:

(a) estimating a time to transfer unreceived instances of said sequential one of a plurality of packets by point-to-point communication with said recipients, (b) estimating a count of unreceived instances of said sequential one of a plurality of packets following an additional broadcast; and (c) rebroadcasting said sequential one of a plurality of packets if said time to transfer said unreceived instances of said sequential one of a plurality of packets by point-to-point communication with said recipients is greater than a sum of said time to broadcast said sequential one of a plurality of packets and a time to transfer said estimated count of said sequential one of a plurality of packets by point-to-point communication.

5. The method of claim 4 wherein the step of estimating a time to transfer said sequential one of a plurality of packets by point-to-point communication with said recipients comprises the steps of:

(a) polling at least one recipient to identify unreceived data for said recipient;

(b) estimating a time to successfully transfer said unreceived data to said recipient by point to point communication; and (c) summing said estimated times to successfully transfer said unreceived data to recipients reporting unreceived data.

* * * * *